United States Patent Office 3,542,849
Patented Nov. 24, 1970

3,542,849
PROCESS FOR THE PREPARATION OF N-ARYL-α-AMINO CARBOXYLIC ACID ESTERS
Roland Nast, Cologne-Buchheim, and Kurt Ley, Leverkusen, Germany, assignors to Farbenfabriken Bayer Aktiengesellschaft, Leverkusen, Germany, a corporation of Germany
No Drawing. Filed Dec. 2, 1966, Ser. No. 598,625
Claims priority, application Germany, Jan. 11, 1966,
F 48,133
Int. Cl. C07c *101/44*
U.S. Cl. 260—471    4 Claims

ABSTRACT OF THE DISCLOSURE

Preparation of N-aryl-α-amino carboxylic acid esters by reaction of the corresponding nitrile with 80 to 100% by weight sulfuric acid or fuming sulfuric acid with an $SO_3$ content of up to 10% by weight, reaction of resulting product at 60 to 110° C. with a primary alkanol and recovering desired ester by neutralizing the reaction mixture.

This invention relates to a process for the preparation of N-aryl-α-amino carboxylic acid esters from N-aryl-α-amino carboxylic acid nitriles.

N-aryl-α-amino carboxylic acid esters can be obtained by reacting α-halogen carboxylic acid esters with arylamines. In some instances, however, the α-halogen carboxylic acid esters themselves are difficult to prepare, whilst their reaction with arylamines can be accompanied by secondary reactions. Apart from ester formation, amide formation and disubstitution of the arylamine can also take place.

In addition, it is known that N-aryl-α-amino carboxylic acids can be converted into the corresponding esters by esterification in the usual way. The N-aryl-α-amino acids can be prepared from the corresponding nitriles by hydrolysis with aqueous acids. They are, however, difficult to isolate in some cases, particularly when there is an additional amino group present on the aryl radical (betaine formation can take place).

In other words, there is no known method of converting N-aryl-α-amino acid nitriles into the corresponding esters in a single reaction which does not involve the isolation of intermediate products.

It is also known that N-alkyl-α-amino acid esters can be obtained from the corresponding nitriles by reaction with absolute alcohols in the presence of gaseous hydrogen chloride, followed by hydrolysis of the resulting iminoesterhydrochlorides. Unfortunately, it is not possible to obtain N-aryl-α-amino acid esters by this process.

Neither can the esters in question be formed by the direct action of a mixture of alcohol and concentrated sulphuric acid nitriles. The arylamine is in fact split off in this reaction.

The present invention relates to a process for the preparation of N-aryl-α-amino acid esters from the corresponding nitriles in a one step reaction in which the crude esters obtained already have a high degree of purity.

According to the present invention, the nitriles are introduced at temperatures in the range from 0 to 90° C., preferably from 20 to 80° C., with cooling, into 80 to 100% by weight sulphuric acid or into fuming sulphuric acid with an $SO_3$-content of up to 10% by weight, preferably into 96% by weight sulphuric acid. Salt formation is, in this instance, accompanied by an addition of the sulphuric acid to the nitrile groups. The addition reaction takes from 10 minutes to 20 hours, depending upon the temperature and concentration of the sulphuric acid. 1.5 to 5 parts by weight, preferably, 3.5 to 4 parts by weight, of sulphuric acid are conveniently used per part by weight of nitrile. The reaction mixture is then heated with primary alcohols for a few hours at 60 to 110° C., preferably at 80 to 95° C. 0.8 to 4 parts by weight, preferably 1.5 to 2 parts by weight, of alcohol are conveniently used per part by weight of sulphuric acid. The reaction time is governed by the temperature and by the type of nitrile used, and is generally from 1 to 10 hours. The reaction mixture is then neutralised, e.g. poured on to ice and adjusted to a pH of 8 to 9 by the addition of alkalis, with cooling. The temperature should preferably not exceed 25° C. during neutralisation. The compounds separated out are worked up in the usual way.

It is essential that the sulphuric acid and the alcohol act successively on the nitrile. The sulphuric acid must have a concentration of at least 80% by weight.

The nitriles may also be added to the concentrated sulphuric acid in dissolved form, for example dissolved in chlorobenzene or benzene. Before the alcohol is added, as much as possible of this solvent is removed e.g. distilled off in vacuo. The reaction then proceeds as indicated above.

Both mono- and di-α-amino acid nitriles may be used in the reaction. It it also possible to use N-aryl-α-amino acid nitriles whose aryl radicals are linked by methylene bridges or by hetero atoms such as oxygen, sulphur or nitrogen.

Preferred N-aryl-α-amino acid nitriles for the process according to the invention have the following general formulae

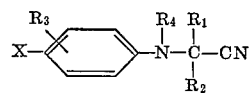

wherein
X represents

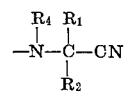

or

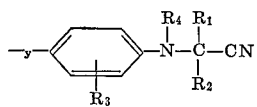

or a hydrogen atom
in which:

$y$ represents $CH_2$, O, S or NH;
$R_1$ and $R_2$ represents hydrogen or alkyl groups;
$R_3$ represents an alkyl, alkoxy, hydroxy, monoalkylamino dialkylamino- or phenylamino group; and
$R_4$ represents hydrogen or an alkyl group, and in which apart from the p-position (as in the formula), the substituent X may also occupy the m-position.

Suitable alcohols are primary alcohols, preferably primary aliphatic alcohols having 1 to 10 carbon atoms in their alkyl moiety, such as methanol, ethanol, n-propanol and n-butanol.

The following N-aryl-α-aminoacid esters, for example, can be obtained by the process according to the invention:

methyl N-phenyl-α-aminoacetate
methyl N-phenyl-α-aminopropionate
methyl N-phenyl-α-amino-n-valerate
methyl N-phenyl-α-aminoisobutyrate
n-butyl N-phenyl-α-aminoisobutyrate
ethyl N-p-methoxyphenyl-α-aminoisobutyrate
methyl N-p-dimethylaminophenyl-α-aminoacetate
ethyl N-p-diethylaminophenyl-α-aminoisobutyrate
methyl N-p-phenylaminophenyl-α-aminoisobutyrate
methyl N-p-cyclohexylaminophenyl-α-aminoisobutyrate
methyl N-p-hydroxyphenyl-α-aminoisobutyrate
methyl N-p-tolyl-α-aminoisobutyrate
N,N'-bis-carbomethoxyisopropyl-1,4-phenylene diamine
N,N'-bis-carbomethoxyisopropyl-1,3-phenylene diamine
N,N'-bis-carbethoxymethyl-1,4-phenylene diamine
N,N'-bis-carbethoxymethyl-4,4'-diaminodiphenyl methane
N,N'-bis-carbomethoxyisopropyl-4,4'-diaminodiphenyl methane
N,N'-bis-carbomethoxymethyl-4,4'-diaminodiphenyl ether
N,N'-bis-carbomethoxyisopropyl-4,4'-diamino diphenylamine The compound obtained by the process according to the invention are valuable intermediate products for the production of pharmaceuticals and plant protection agents. Following their reaction with diisocyanates, the bifunctional esters are suitable for use in temperature-resistant lacquers.

Example 1a

Gaseous HCl is introduced for 5 hours into a boiling solution of 50 g. of N-phenyl-α-aminoisobutyro-nitrile in 150 cc. of methanol. The solvent is then distilled off in vacuo. The brown, syrupy residue is dissolved in water, Following the addition of active carbon, the product is separated by filtration from a small undissolved greasy component, after which a concentrated aqueous solution of ammonia is introduced until the reaction mixture has a pH of 8 to 9. The precipitated oil is taken up in methylene chloride, the solution is dried with calcium chloride and the solvent is distilled off in vacuo. 30 g. of brown oil, from which no methyl N-phenyl-α-aminoisobutyrate can be isolated, are obtained as residue.

Example 1b 100 g. of HCl gas are introduced with cooling at 10 to 15° C. into a solution of 40 g. of N-phenyl-α-amino-isobutyronitrile in 100 cc. of methanol. The reaction mixture is stirred for 7 hours at room temperature, as a result of which a crystalline deposit is gradually precipitated. The reaction mixture is left standing for another 15 hours at room temperature, after which ca. 50 cc. of the solvent are distilled off in vacuo. The crystalline deposit is suction-filtered and washed with cold methanol. 32 g. of N-phenyl-α-aminoisobutyric acid iminoester dihydrochloride are obtained. 23 g. of N-phenyl-α-amino-isobutyramide are obtained from it by dissolving it in water, following by the addition of an aqueous solution of ammonia or dilute sodium hydroxide. 16 g. of a mixture of N-phenyl-α-aminoisobutyramide and starting material can be obtained from the mother liquor.

Example 1c 23 g. (0.63 mol) of HCl gas are introduced at room temperature with cooling into a solution of 40 g. (0.25 mol) of N-phenyl-α-aminoisobutyronitrile. The reaction mixture is then stirred for 10 hours at room temperature, and the solution is left standing for another 20 hours at room temperature. The solvent is then distilled off in vacuo, the crystalline residue is dissolved in water and aqueous ammonia solution is added until the reaction mixture has a pH of 8. The precipitated deposit is then suction-filtered. 30 g. of starting material are obtained.

Example 1d 23 g. (0.63 mol) of HCl gas are introduced into a solution of 40 g. (0.25 mol) of N-phenyl-α-aminoisobutyronitrile. The solution is then heated for seven hours until it boils, after which the solvent is distilled off in vacuo. The crystalline residue is dissolved in water, after which aqueous ammonia solution is added until the reaction mixture has a pH of about 9. The precipitated oil is taken up in benzene and the solvent is distilled off in vacuo. 18 g. of a yellow oil are obtained as residue. Analysis by gas chromatography shows that it comprises 92.7% of aniline.

Example 1e

A solution of 50 g. of N-phenyl-α-amino-isobutyronitrile in a mixture of 100 cc. of methanol and 50 cc. of 96% by weight sulphuric acid, is heated for three and a half hours at boiling point. Ca. 50 cc. of methanol are then distilled off in vacuo, the solution is cooled to 20° C. and then poured onto ice. Concentrated aqueous ammonia solution is then added to the reaction mixture until it has a pH of 8. The precipitated oil is taken up in methylene chloride, the solution is dried with calcium chloride and the solvent is distilled off in vacuo. The oily residue is distilled in vacuo. 22 g. of a yellowish oil are obtained. Analysis by gas chromatography shows that it comprises 92% of aniline.

Example 2

24 g. of N-phenylaminoacetonitrile are introduced with stirring and cooling at 20–25° C. in 48 cc. of 96% by weight sulphuric acid. The reaction mixture is stirred for two and a half hours at room temperature, after which 100 cc. of methanol are run into it with cooling. It is then heated for three hours at boiling point. The solution is then cooled and poured onto ice. A concentrated aqueous solution of ammonia is then added to the reaction mixture until it has a pH of 8. The precipitated crystalline deposit is suction-filtered and dried in air at room temperature. 27 g. of

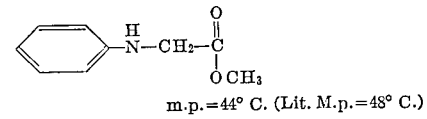

m.p.=44° C. (Lit. M.p.=48° C.)

are obtained.

Example 3

32 g. of N-methyl-N-phenylaminoacetonitrile are added dropwise with stirring and cooling at 20° C. to 64 cc. of 96% by weight sulphuric acid. The reaction mixture is then stirred for six hours at room temperature, after which 150 cc. of methanol are run into it. It is then heated for another four hours at boiling point. The solution is then cooled to room temperature and poured onto ice. A concentrated aqueous solution of ammonia is added to the reaction mixture until it has a pH of 8. The precipitated oil is taken up in methylene chloride and the solvent is distilled off in vacuo. The oily residue is dissolved in light petrol, the resulting solution is treated with active carbon and the solvent is distilled off in vacuo. 31 g. of

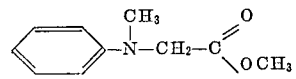

are obtained as residue in the form of a yellowish oil.

Calcd. for $C_{10}H_{13}NO_2$ (179.2) (percent): C, 67.0; H, 7.3; N, 7.8. Found (percent): C, 67.28; H, 7.38; N, 8.18.

Example 4

50 g. of N-phenyl-α-aminopropiononitrile are introduced with stirring and cooling at 15–20° C. into 100 cc. of 96% by weight sulphuric acid. The solution is stirred for five hours at room temperature and then left standing for another 15 hours at room temperature. 200 cc. of methanol are then run in with cooling, followed by heating for 5 hours at boiling point. The solution is then cooled to 20° C. and poured on to ice. A concentrated aqueous solution of ammonia is then added to the reaction mixture until it has a pH of 8. The precipitated crystalline deposit is suction-filtered and dried in air. 51 g. of

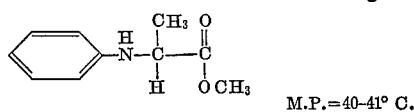

M.P.=40–41° C.

are obtained.

Calcd. for $C_{10}H_{12}NO_2$ (179.2) (percent): C, 67.0; H, 7.3; N, 7.8. Found (percent): C, 67.22; H, 7.43; N, 8.05.

Example 5

65 g. of N-phenyl-α-amino-n-valeronitrile are introduced with stirring and cooling at 40–45° C. into 100 cc. of 96% by weight sulphuric acid. The reaction mixture is then heated for 15 minutes at 80° C. and cooled to room temperature. 200 cc. of methanol are then run in with cooling, after which it is heated for another 4 hours at boiling point. The solution is then cooled and poured onto ice. A concentrated aqueous solution of ammonia is then added to the reaction mixture until it has a pH of 8. The precipitated crystalline deposit is suction-filtered and dissolved, while still moist, in methylene chloride. The solution is dried with calcium chloride and the solvent is distilled off in vacuo. The oily residue is dissolved in 500 cc. of light petrol, after which it is separated by filtration from a little undissolved brown syrup, following the addition of active carbon. The solvent is then distilled off in vacuo. 45 g. of

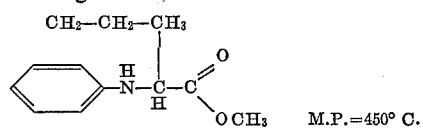

M.P.=450° C.

are obtained.

Calcd. for $C_{12}H_{17}NO_2$ (207.3) (percent): C, 69.5; H, 8.3; N, 6.8. Found (percent): C, 69.61; H, 8.54; N, 7.2.

Example 6

100 g. of N-phenyl-α-aminoisobutyronitrile are introduced with stirring and cooling at 55–60° C. into 150 cc. of 96% by weight sulphuric acid. The reaction mixture is stirred for one and a half hours at 60° C. after which 300 cc. of methanol are run into it with cooling. It is then heated for another four hours at boiling point. After it has been cooled to 20° C., the solution is poured onto ice. A concentrated aqueous solution of ammonia is added to the reaction mixture until it has a pH of 8. The precipitated crystalline deposit is suction-filtered and dissolved, while still moist, in benzene. The benzene solution is dried with calcium chloride, after which the solvent is distilled off in vacuo. 107 g. of

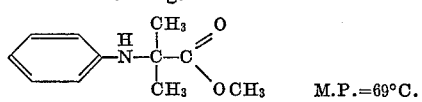

M.P.=69° C.

are obtained as residue.

Calcd. for $C_{11}H_{15}NO_2$ (193.2) (percent): C, 68.3; H, 7.8; N, 7.3. Found (percent): C, 68.3; H, 7.98; N, 7.88.

If 80% by weight sulphuric acid or fuming sulphuric acid with an $SO_3$-content of 10% by weight is used in place of 96% by weight sulphuric acid, methyl N-phenyl-α-aminoisobutyrate is again obtained. The yields are of the same order.

Example 7

50 g. of N-phenyl-α-aminoisobutyronitrile are introduced with stirring and cooling at 50–55° C. into 100 cc. of 96% by weight sulphuric acid. The solution is stirred for one and a half hours at 55° C., after which 200 cc. of n-butanol are added to it with cooling. It is then heated for another four hours at boiling point. After it has been cooled to 20° C. the solution is poured onto ice. A concentrated aqueous solution of ammonia is then added to the reaction mixture until it has a pH of 8–9. The precipitated oil is taken up in methylene chloride and the solvent is distilled off in vacuo. The oily residue is dissolved in light petrol, a small undissolved component is filtered off and the solvent is distilled off in vacuo. 40 g. of

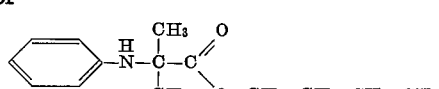

are obtained by distilling the oily residue. $B.P._{0.35\ mm.}$= 123–129° C.

Calcd. for $C_{14}H_{21}NO_2$ (235.3) (percent): C, 71.4; H, 9.0; N, 6.0. Found (percent): C, 70.63; H, 9.11; N, 6.50.

Example 8

If an equivalent quantity of ethanol is used in place of n-butanol, as described in Example 4, 39 g. of

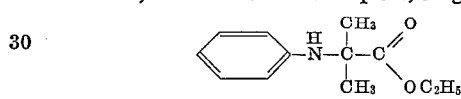

are obtained by distilling the oil obtained as crude product. $B.P._{0.25\ mm.}$=94–99° C.

Calcd. for $C_{12}H_{17}NO_2$ (207.3) (percent): C, 69.6; H, 8.3; N, 6.8. Found (percent): C, 69.61; H, 8.34; N, 7.11.

Example 9

100 g. of N-methoxyphenyl-α-aminoisobutyronitrile are introduced with stirring and cooling at 60° C. into 150 cc. of 96% by weight sulphuric acid. The solution is stirred for one and a half hours at 60° C., after which 350 cc. of methanol are run in with cooling. It is then heated for another four hours at boiling point. After it has been cooled to 20° C., the solution is poured onto ice. A concentrated aqueous solution of ammonia is added to the reaction mixture until it has a pH of 8. The precipitated oil is taken up in methylene chloride and the solvent is distilled off in vacuo. The oily residue is distilled in a high vacuum. 93 g. of

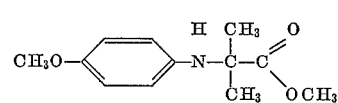

are obtained in the form of a colourless oil. $B.P._{0.7\ mm.}$= 150–153° C.

Example 10

50 g. of N-hydroxyphenyl-α-aminoisobutyronitrile are introduced with stirring and cooling at 20° C. into 100 cc. of 96% by weight sulphuric acid. The solution is stirred for five hours at room temperature, and left to stand for another fifteen hours at room temperature, after which 250 cc. of methanol are run into it with cooling. It is then heated for another three hours at boiling point. After the solution has been cooled to 20° C., it is poured onto ice. A concentrated aqueous solution of ammonia is added to the reaction mixture until it has a pH of 8–9. An oil is obtained which gradually solidifies. To complete precipitation, 200 cc. of a saturated aqueous solution of sodium acetate are added, followed by filtration under suction. The product is dissolved, while still moist, in methylene chloride. The solution is dried with calcium chloride and the solvent is distilled off in vacuo. The crystalline residue is suspended in light petrol and suction-filtered. 33 g. of

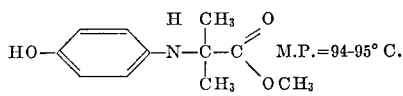 M.P.=94–95° C.

are obtained.

Calcd. for $C_{11}H_{15}NO_3$ (209.2) (percent): C, 63.2; H, 7.2; N, 6.7. Found (percent): C, 63.08; H, 7.28; N, 6.75.

Example 11

100 g. of N-dimethylaminophenyl-α-aminoisobutyronitrile are introduced with stirring and cooling at 60° C. into 200 cc. of 96% by weight sulphuric acid. The solution is stirred for one and a quarter hours at 60° C., after which 400 cc. of methanol are run into it with cooling. It is then heated for 4–5 hours at boiling point. After it has been cooled at 20° C., the solution is poured on to ice. A concentrated aqueous solution of ammonia is added to the reaction mixture until it has a pH of 8–9. The precipitated crystalline deposit is suction-filtered. 89 g. of grey crystals melting at 36° C. are obtained. Following distillation in a high vacuum. B.P.$_{0.4 mm.}$=153/4° C. 76 g. of colourless

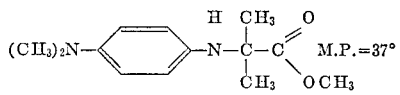 M.P.=37° are obtained.

Calcd. for $C_{13}H_{20}N_2O_2$ (236.3) (percent): C, 66.1; H, 8.5; N, 11.9. Found (percent): C, 66.61; H, 8.60; N, 12.17.

Example 12

A solution of 190 g. of freshly distilled N-cyclohexyl-p-phenylene diamine and 95 g. of acetone cyanohydrin in 400 cc. of methanol, is heated at boiling point for 5 hours under nitrogen. The solution is then cooled to 20° C. and a few cc. of aqueous sodium dithionite solution added to it. 250 cc. of chlorobenzene and 1.5 litres of water are then run in with stirring. The organic phase is separated off, 100 cc. of benzene are added and the water, with a small part of the solvent, is distilled off in vacuo. The resulting solution of N-p-cyclohexylamino-phenyl-α-aminoisobutyronitrile in chlorobenzene/benzene is added dropwise with stirring and cooling at 60° C. to 350 cc. of 96% by weight sulphuric acid. The solution is stirred for one hour at 60° C. and the solvent distilled off in vacuo at a bath temperature of 56° C. 700 cc. of methanol are then run in with cooling, and the solution is heated for another five hours at boiling point. After it has been cooled to 20° C., the solution is poured onto ice. A concentrated aqueous solution of ammonia is added to the reaction mixture until it has a pH of 8–9. The precipitated oil is taken up in chloroform, filtered off from the undissolved component following the addition of active carbon, and the solvent is distilled off in vacuo. 244 g. of

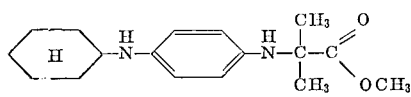

are obtained as residue in the form of a violet-coloured thick oil.

Calcd. for $C_{17}H_{26}N_2O_2$ (290.4) (percent): C, 70.4; H, 9.0; N, 9.7. Found (percent): C, 70.79; H, 9.22; N, 9.91.

Example 13

50 g. of N,N′-bis-cyanoisopropyl-1,4-phenylene diamine are introduced with stirring and cooling at 20–25° C. into 150 cc. of 96% by weight sulphuric acid. Stirring is continued for another 30 minutes at room temperature, after which the solution is left standing for a further 20 hours at room temperature. 300 cc. of methanol are then run in to it with stirring and cooling, followed by heating for a further 5 hours at boiling point. After it has been cooled to 20° C., the solution is poured onto ice. A concentrated aqueous solution of ammonia is added to the reaction mixture until it has a pH of 8–9. The precipitated crystalline deposit is suction-filtered and dried at 50° C. 50 g. of

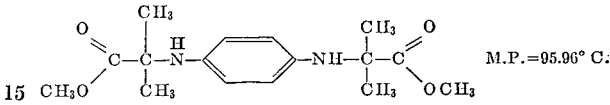 M.P.=95.96° C.

are obtained.

Calcd. for $C_{16}H_{24}N_2O_4$ (308.4) (percent): C, 62.3; H, 7.8; N, 9.1. Found (percent): C, 62.18; H, 7.87; N, 9.38.

Example 14

700 g. of N,N′-bis-cyanoisopropyl-1,3-phenylene diamine are introduced with stirring and cooling at 50–55° C. into 1.5 litres of 96% by weight sulphuric acid. Stirring is continued for another two hours at 50°, after which 3 litres of methanol are run in with cooling, followed by heating for another 8½ hours at boiling point. After it has been cooled to 20° C., the solution is poured onto ice. A concentrated aqueous solution of ammonia is added to the reaction mixture until it has a pH of 8–9. A syrupy deposit is obtained which gradually solidifies. The product is suction-filtered and then purified by solution in hot methanol, followed by precipitation with an equivalent quantity of water. 536 g. of

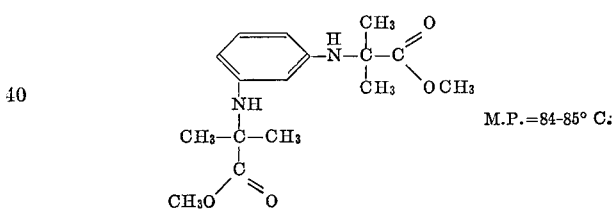 M.P.=84–85° C.

are obtained.

Calcd. for $C_{16}H_{24}N_2O_4$ (308.4) (percent): C, 62.3; H, 7.9; N, 9.1. Found (percent): C, 62.16; H, 7.92; N, 9.15.

Example 15

100 g. of N,N′-bis-cyanoisopropyl-4,4′-diaminodiphenylmethane are introduced with stirring and cooling at 60° C. into 200 cc. of 96% by weight sulphuric acid. Stirring is continued for another hour at 60° C., after which 400 cc. of methanol are run in with cooling, followed by heating for another five hours at boiling point. After is has been cooled to 20° C., the solution is poured onto ice. A concentrated aqueous solution of ammonia is added to the reaction mixture until it has a pH of 8–9. The precipitated deposit is suction-filtered and dissolved, while still moist, in 450 cc. of boiling methanol. The product is separated by filtration from a small undissolved component, after which 150 cc. of water are added. The product is cooled and the precipitated deposit suction-filtered. 84 g. of

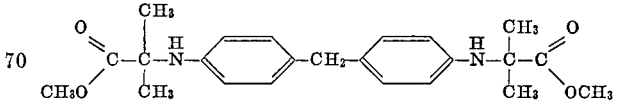

are obtained. M.P.=121–122° C.

Calcd. for $C_{23}H_{30}N_2O_4$ (percent): C, 69.4; H, 7.6; N, 7.0. Found (percent): C, 69.50; H, 7.70; N, 7.21.

Example 16

325 g. of N,N'-bis-cyanomethyl-4,4'-diaminodiphenyl methane are introduced with stirring and cooling at 50–60° C. into 500 cc. of 96% by weight sulphuric acid. Stirring is continued for one and a quarter hours at 60° C., after which 750 cc. of methanol are run in with cooling, followed by another 2½ hours heating at 80° C. After it has been cooled, the solution is poured onto ice. A concentrated aqueous solution of ammonia is added to the reaction mixture until it has a pH of 8–9. The precipitated deposit is suction-filtered and crystallised from methanol. 257 g. of

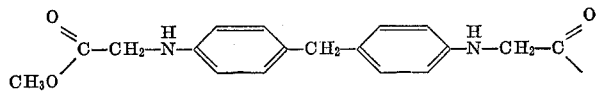

are obtained. M.P.=114–116° C.

Calc'd for $C_{19}H_{22}N_2O_4$ (percent): C, 66.6; H, 6.5; N, 8.2. Found (percent): C, 66.37; H, 6.71; N, 8.48.

What is claimed is:

1. Process for preparing N-aryl-α-amino carboxylic acid ester which comprises reacting N-aryl-α-amino carboxylic acid nitrile at a temperature between 20 and 90° C. with (a) 80 to 100% by weight concentrated sulfuric acid or (b) fuming sulfuric acid containing up to 10% by weight of sulfur trioxide to form an addition product, then heating said addition product and a primary alkanol containing 1 to 10 carbon atoms at a temperature of 60 to 110° C. and recovering resulting ester by neutralizing resulting reaction mixture.

2. Process according to claim 1, wherein the N-aryl-α-amino carboxylic acid nitrile is used as a solution in an organic solvent.

3. Process according to claim 1, wherein said N-aryl-α-amino carboxylic acid nitrile is a compound of the formula

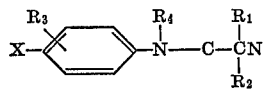

wherein X represents

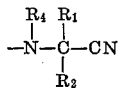

or

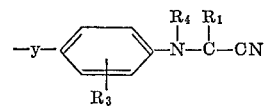

or a hydrogen atom in which $y$ represents $CH_2$, O, S or NH; $R_1$ and $R_2$ represent hydrogen or alkyl groups; $R_3$ represents an alkyl, alkoxy, hydroxy, monoalkylamino, dialkylamino- or phenylamino group; and $R_4$ represents hydrogen or an alkyl group, and in which apart from the p-position, the substituent X may also occupy the m-position.

4. Process according to claim 1 wherein said N-aryl-α-amino carboxylic acid nitrile is N-phenyl-α-aminoisobutyronitrile, N - phenylaminoacetonitrile, N - methyl-N-phenylaminoacetonitrile, N - phenyl-α-aminopropionitrile, N-phenyl-α-amino-n-valeronitrile, N - methoxyphenyl-α-aminoisobutyronitrile, N-hydroxyphenyl-α-aminoisobutyronitrile, N-dimethylaminophenyl-α-aminoisobutyronitrile, N - p - cyclohexylaminophenyl-α-aminoisobutyronitrile, N,N'-bis-cyanoisopropyl-1,4-phenylene diamine, N,N'-bis-cyanoisopropyl-1,3-phenylene diamine, N,N'-bis-cyanoisopropyl - 4,4'-diaminodiphenylmethane or N,N'-bis-cyanomethyl-4,4'-diaminodiphenylmethane.

References Cited

Finar, I. L., Organic Chemistry (1963) vol. I, published by R. Clay and Co., Ltd. Great Britain.

JAMES A. PATTEN, Primary Examiner

L. A. THAXTON, Assistant Examiner

U.S. Cl. X.R.

260—465, 470, 558